United States Patent
Coates et al.

[11] 3,933,743
[45] Jan. 20, 1976

[54] ORGANOTIN THERMAL STABILIZERS FOR PVC RESINS

[75] Inventors: Harold Coates, Wombourne; John Desmond Collins, Albrighton; Iftikhar Hussain Siddiqui, Birmingham, all of United Kingdom

[73] Assignee: Albright & Wilson Limited, Oldburg near Birmingham, United Kingdom

[22] Filed: July 22, 1974

[21] Appl. No.: 490,241

Related U.S. Application Data
[62] Division of Ser. No. 359,177, May 10, 1973, abandoned.

[30] Foreign Application Priority Data
May 10, 1972 United Kingdom............... 21828/72
May 10, 1972 United Kingdom............... 21829/72

[52] U.S. Cl. 260/45.75 J; 260/45.75 S; 260/45.75 T; 260/429.7
[51] Int. Cl.²............................................ C08J 3/20
[58] Field of Search.. 260/45.75 S, 45.75 T, 45.75 J

[56] References Cited
UNITED STATES PATENTS

| | | | |
|---|---|---|---|
| 2,631,990 | 3/1953 | Mack et al. | 260/45.75 |
| 2,998,441 | 8/1961 | Jackson et al. | 260/45.75 |
| 3,019,247 | 1/1962 | Mack et al. | 260/45.75 |
| 3,217,004 | 11/1965 | Hechenbleikner | 260/45.75 |
| 3,222,317 | 12/1965 | Kauder | 260/45.75 |
| 3,297,629 | 1/1967 | Kauder | 260/45.75 |
| 3,433,763 | 3/1969 | Suzuki et al. | 260/45.75 |
| 3,637,777 | 1/1972 | Hock | 260/45.75 |
| 3,642,846 | 2/1972 | Hoch | 260/45.75 |
| 3,665,024 | 5/1972 | Oakes et al. | 260/45.75 |

*Primary Examiner*—V. P. Hoke
*Attorney, Agent, or Firm*—Robert P. Auber; Kenneth G. Wheeless; Robert Spector

[57] ABSTRACT

Organotin compounds with low tin content suitable as stabilizers for halogen containing resins e.g. polyvinyl chloride are of formula

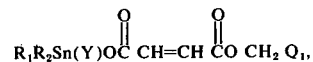

where $R_1$ and $R_2$ are $C_{1-20}$ alkyl, cycloalkyl or phenyl, $Q_1$ is of formula $-C(CH_2Z)_2Q_2$, wherein $Q_2$ is H, $C_{1-6}$ alkyl or $CH_2Z$, and each Z is

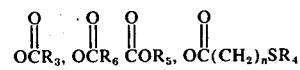

or a pair of Z is

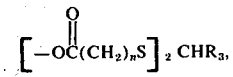

$R_3$ is $C_{1-20}$ alkyl, optionally substituted phenyl, or alkylphenyl or if two $R_3$ groups are present in the molecule, they may constitute a single bond between the carbon atoms immediately adjacent to said $R_3$ radicals, $C_{1-20}$ alkylene $C_{2-20}$ alkenylene or optionally substituted phenylene, $R_4$ is $C_{1-20}$ alkyl, optionally substituted phenyl ($C_{1-6}$) alkyl or two groups $R_4$ are optionally phenyl substituted $C_{1-20}$ alkylene or $C_{2-20}$ alkenylene or $C_{5-6}$ cycloalkylene $R_5$ is $C_{1-20}$ alkyl, optionally substituted phenyl or alkylphenyl or if two $R_5$ groups are present, these may be bonded together to form a $C_{1-20}$ alkylene radical or a substituted phenylene radical, $R_6$ is a single bond, $C_{1-20}$ alkylene, or $C_{2-20}$ alkenylene, n alkenylene, 1-6 and Y is

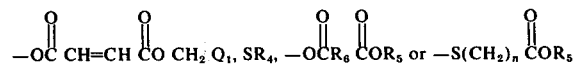

or Y and $OCOCH = CHOOCH_2Q_1$ are together $(OCOCH = CHCOOCH_2)_2 C(CH_2Z)Q_2$.

6 Claims, No Drawings

ORGANOTIN THERMAL STABILIZERS FOR PVC RESINS

This is a division of application Ser. No. 359,177 filed May 10, 1973, now abandoned.

The present invention relates to organotin compounds, processes for preparing them, and to their use as stabilisers for polymeric materials in particular halogenated resins such as polymers and copolymers of vinyl and vinylidene chloride.

The use of organotin compounds including derivatives of half esters of organotin maleates as stabilisers for halogenated resins has for many years been recognised as being highly effective. However, the compounds employed have normally been those having a comparatively high tin content and so, in view of the high cost of tin, are expensive relative to other available stabilisers. Thus, despite their high efficiency these compounds are still not so widely used as other less effective materials.

The compounds of the present invention are new derivatives of organotin half ester maleates which have a lower tin content than most conventional organotin compounds and so are potentially cheaper. The stabilising ability of some of them may match that of some of the conventional materials on an equal tin basis and so may be able to achieve the same degree of stabilisation for lower cost.

Accordingly, the present invention provides an organotin compound of the formula:

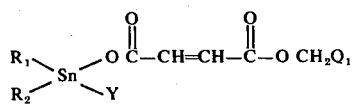

wherein each of $R_1$ and $R_2$, which are the same or different, is an alkyl group of 1 to 20 carbon atoms, a cycloalkyl or a phenyl group, E.g. a cyclohexyl group, $Q_1$ is of formula:

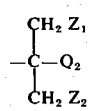

wherein $Q_2$ is hydrogen, an alkyl group of 1 to 6 carbon atoms, or $CH_2 Z_3$, wherein $Z_3$ is as defined for $Z_1$ or $Z_2$ below, and each of $Z_1$ and $Z_2$, which are the same or different, is of formula:

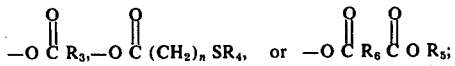

or a pair of radicals selected from among $Z_1$, $Z_2$ and $Z_3$ may be bonded together to form a group of formula:

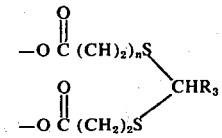

wherein $R_3$ is an alkyl group of 1 to 20 carbon atoms, a substituted or unsubstituted phenyl group, or an alkylphenyl group, which is substituted or unsubstituted, or if two $R_3$ groups are present on the same molecule, they may form a single bond between the carbon atoms immediately adjacent to each of the $R_3$ radicals, an alkylene group of 1 to 20 carbon atoms, an alkenylene group of 2 to 20 carbon atoms or a substituted or unsubstituted phenylene group.

$R_4$ is an alkyl group of 1 to 20 carbon atoms or substituted or unsubstituted phenyl alkyl group with 1 to 6 carbon atoms in the alkyl group, or two groups $R_4$ together are an alkylene group of 1 to 20 carbon atoms, which is unsubstituted or substituted by at least one phenyl group, or an alkenylene group of 2 to 20 carbon atoms or a cycloalkylene group of 5 or 6 carbon atoms.

$R_5$ is an alkyl group of 1 to 20 carbon atoms, a substituted or unsubstituted phenyl group or an alkylphenyl group, which is substituted or unsubstituted, or two groups $R_5$ together are an alkylene group of 1 to 20 carbon atoms.

$R_6$ is a single bond, an alkylene group of 1 to 20 carbon atoms or an alkenylene group of 2 to 20 carbon atoms, or substituted or unsubstituted phenyl group. $n$ is an integer of 1 to 6, and Y is of formula:

or Y and the group $- O CO CH = CH - CO O CH_2 Q_1$ together form a group of formula:

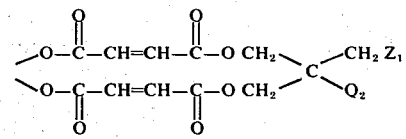

Preferably $Q_1$ is of formula:

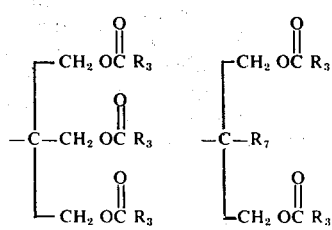

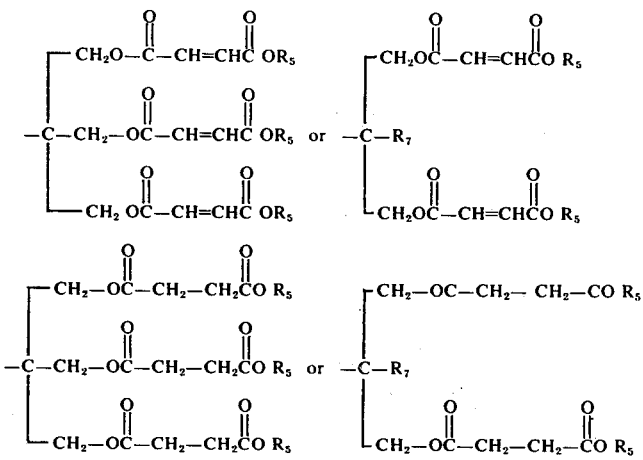

Examples of particular groups of compounds falling within the scope of the invention which we have found to be useful include:

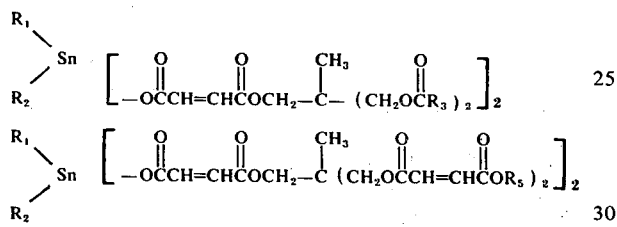

In preferred compounds of the invention, $R_1$ and $R_2$ are n-butyl or n-octyl groups, $R_3$ is an alkyl group of 8–20 Carbon atoms, especially an n-undecyl group, or o-hydroxyphenyl group, $R_4$ and $R_5$ are alkyl groups of 8–20 carbon atoms, especially iso-octyl groups, $R_6$ is a vinyl or ethylene group, $R_7$ is hydrogen or a methyl group and $n$ is 2.

The present invention also provides a process for preparing an organotin compound containing a

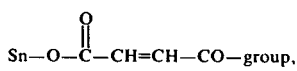

which comprises in step (a) reacting an alcoholic component which is at least one of penta erythritol and a triol of formula $(HO\ CH_2)_3\ CR_7$, maleic acid (or a derivative thereof, preferably maleic anhydride) and one or more blocking agents, which are (i) of formula $R_3\ COOH$, of formula $R_6(COOH)_2$ and $R_5\ OH$ or of formula $HOOC\ R_6\ COOR_5$, of formula $HOOC(CH_2)_nSR_4$ or $[HOOC\ (CH_2)_nS]_2\ CHR_3$, or $HOOC(CH_2)_2\ SH$ followed by $Hal\ R_4$, $Hal_2\ CHR_3$ (Hal is a halogen) or $R_3\ CHO$ when the number of moles of OH group in the alcoholic component is greater than the number of moles of maleic acid (or derivative thereof), and (ii) of formula $R_5\ OH$ when the number of moles of alcoholic component is less than or less than half the number of moles maleic acid (or derivative thereof), the alcoholic component, blocking agent, maleic acid (or derivative) thereof being reacted in any order, to produce an intermediate containing 1 or 2

groups per mole, and in step (b) reacting the intermediate formed in step (a) with an organotin compound of formula $R_1R_2SnO$ or $R_1R_2SnHal_2$.

In step (b) of the process, the organotin compound can be reacted with the intermediate from step (a) in the presence of at least one compound of formula $HSR_4$, $HOOCR_6\ COOR_5$ or $HS\ (CH_2)_n\ COOR_5$. In preferred processes, the alcoholic component is reached with a molar excess of maleic anhydride, and the reaction product produced is reacted with a blocking agent of formula $R_5OH$, or the alcoholic component is reacted with a compound of formula $HOOCR_6\ COOR_5$ to form a reaction product containing 1 $HOCH_2$ group per mole, and the reaction product is reacted with maleic anhydride.

Among the compounds which are particularly useful are those derived from pentaerythritol. These may be obtained by the reaction of a diorganotin oxide with a reaction product derived from pentaerythritol, maleic anhydride and a further reactant. The further reactant will normally be a fatty acid or other group (as described above in step (a) capable of reacting with the hydroxyl groups of pentaerythritol. It is of course also possible to employ a dicarboxylic acid to react with the pentaerythritol. Such acids include succinic and maleic acids. If such acids are employed the free carboxyl group will normally be esterified by a fatty alcohol.

It is also possible to employ 1,1,1-trimethylol ethane or a higher homologue thereof instead of pentaerythritol; in this case there are only three reactive hydroxyl groups and thus a lower proportion of maleic anhydride will normally be employed.

Normally, whatever the actual reactants employed, it will be desirable to have an acidic catalyst present such as p-toluene sulphonic acid, hydrochloric acid, or a metal chloride suitable as a Friedel Craft catalysts, such as zinc chloride. Often the reaction will be carried out in the presence of a solvent such as an aromatic hydrocarbon, e.g. a toluene, petrol, xylene, hexane or cyclohexane.

Compounds according to the invention find use as stabilizers for halogen-containing resins.

Accordingly, from a further aspect the present invention provides a composition which comprises a halogen-containing resin (as hereinafter defined) and as a stablizer therefor an organotin compound of the formula

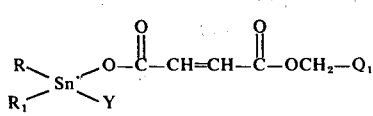

where R, $R_1$, $n$, $Q_1$, and Y are as hereinbefore defined or one prepared by the process of the invention.

In the present specification, a halogen containing resin is defined as a polymer or copolymer of vinyl chloride or vinylidene chloride, a chlorinated vinyl chloride polymer or chlorinated polychlylene.

The organotin compounds will be present in compositions according to the invention in amounts so as to produce the desired stabilizing effect; often this will be 0.01–10%, preferably 0.2–5% especially 2 to 3% by weight based on the total amount of polymeric resin present.

It has also been found that by mixing 1 to 50% by weight (based on the weight of organotin compound of the invention) of a monoalkytin compound such as monobutyltin tris (iso-octyl thioglycollate) with the organotin compound, the stabilizing efficiency of the compound increases. Preferably 5 – 25% based on total amount of organotin compound is used. Other additives which also improve the initial clarity of polymer during thermal tests with organotin compounds are:

a. Butyl epoxy stearate (B.E.S.)
b. Mono-octyltin tri (iso-octyl thioglycollate)
c. Dibutyltin sulphide and oxide
d. Dibutyltin cyclic mercapto acetate and/or Dibutyltin cyclic $\beta$ mercapto propionate. And/or Dioctyltin cyclic mercapto acetate and/or Dioctyltin cyclic $\beta$ mercapto propionate.

Optionally, but advantageously, compositions according to the invention also contained hindered phenols, that is those having at least one alkyl substituent in a position ortho to the hydroxyl group as auxiliary stabilizers. Such phenols which are of use in compositions of the present invention include butylated hydroxylanisole, 2,6-di-tert.-butylphenol, methylene bis-(2,4-di-tert.-butylphenol), methylene bis-(2,6-di-tert.-butylphenol), methylene bis-(2,6-di-tert.-butyl-3-methylphenol), 4,4'-butylidene bis-(6-tert.-butyl-3-methylphenol), methylene bis-(4-ethyl-6-tert.-butylphenol), methylene bis-(4-methyl-2,6-di-tert.-butylphenol). Particularly preferred, however, is 2,6-di-tert.-butyl-4-methyl-phenol. Such phenols may be present in an amount of up to 3%, preferably from 0.01 to 0.05% by weight of the resin and will normally be present at about 4–10% by weight, preferably 5–8%, based on the total amount of organotin compounds used.

Esters of phosphorous and thiophosphorous acids may be employed in compositions according to the invention. Such compounds include halo-phosphites such as tris chloropropyl phosphite and polymeric phosphites such as those obtained from hydrogenated 4,4' isopropylidene diphenol. Preferred phosphites and thiophosphites, however, are monomers having no substituents in the organo-group and having no more than one sulphur atom. These include triaryl phosphites and trialkyl phosphites. Such compounds include, for example, triphenyl phosphite, trixylylphosphite, tri-(nonyl phenyl) phosphite and trioctyl phosphite. Diesters of phosphorous acid such as di-isopropyl phosphite, dibutyl phosphite and diphenyl phosphite are also of use. Particularly preferred, however, are the mixed alkyl aryl phosphites such as octyl diphenyl phosphite, isodecyl diphenyl phosphite and di-isodecyl phenyl phosphite. This particularly pronounced effect may also be obtained by employing a mixture of a triaryl phosphite and an alcohol in conjunction with the organotin compound. A particularly suitable mixture is that of triphenyl phosphite and isodecanol.

The stabilizer composition is also useful if it is employed in a polymer composition containing an epoxy compound, as may be desired for example in cases where a delay of initial colour change is desired. Epoxy compounds which may be employed in such compositions include butyl epoxy stearate, esters of epoxidised oleic acid and compounds of the formula

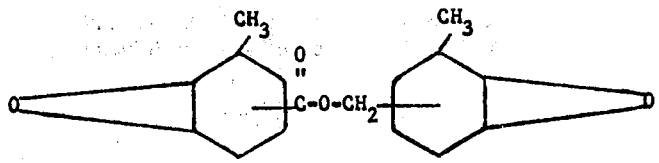

Organotin formulations as described above, optionally including a hindered phenol, an alkylaryl phosphite or an epoxide, will often be used as the only stabilizer in a polymeric vinyl chloride or vinylidene chloride composition. However, if desired conventional thermal stabilizers may also be included. These may include, for example, metal soap stabiliziers, such as cadmium, barium or zinc salts of fatty acids, or lead salts such as lead carbonate or stearate or dibasic lead phosphate or phthalate, or tribasic lead sulphate or conventional organotin stabiliziers such as dibutyltin dilaurate or dibutyltin maleate or sulphur-containing compounds such as dibutyltin bisthioglycollates.

In the practice of the invention the stabilizer formulation may be mixed with the copolymer resin in the conventional manner, for example by milling with the resin on heated rols at 100°–160°C, e.g. about 150°C, although higher temperatures may be used when convenient, or by being mixed with particles of the polymer and then melting and extruding the mixture or by adding the stabilizer to a liquid resin.

Resins which may be used in compositions according to the invention normally contain at least 40% by weight of chlorine. Usually it will be a polymer or copolymer of vinyl chloride or vinylidene chloride but post-halogenated polyvinyl chloride or post halogenated polyolefines, such as polyethylene, may be employed if desired. Suitable monomers, which may form such copolymers with vinyl chloride and vinylidene chloride, include for example acrylonitrile, vinyl acetate, methyl methacrylate, diesters of fumaric acid and maleic acid, ethylene, propylene and lauryl vinyl ether and these co-monomers may be present in an amount of up to 25% of the total weight of monomers copolymerised.

The organotin stabilizer formulation may be employed in either plasticised resin compositions, for example those plasticised with carboxylic ester plasticisers, e.g. di-2-ethylhexyl phthalate, dibutyl sebacate, and di-iso-octyl phthalate or with phosphate esters such as tri (alkyl phenyl) phosphates may be employed in rigid compositions. Such rigid compositions contain little or no plasticiser although for some applications up to about 10% by weight of plasticiser may be present. This is in contrast with plasticised compositions where the amount of plasticiser present is normally greater than 50% by weight of the polymeric material and is often greater than 100% on that basis.

In addition to the stabilizers, the compositions of the invention may also contain conventional additives, e.g. pigments, fillers, dyes and ultraviolet absorbing agents.

The process of the invention will be illustrated by the following examples:

EXAMPLE 1

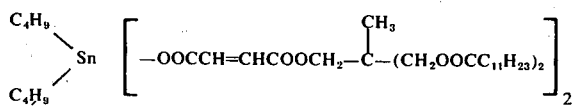

1,1,1 - Trimethylolethane (11.8g, ca 0.1M) and Lauric acid (40g, 0.2M) were refluxed in toluene (200ml) in presence of p-toluene sulphonic acid (ca 0.5g) till the calculated amount of water had collected to give product H.

i.e. $\left(CH_3-\overset{CH_2OH}{\underset{|}{C}}-\right)(CH_2OOCC_{11}H_{23})_2$.

Maleic anhydride (9.8g, 0.1M) was added into the solution (containing product H) and the mixture further refluxed for two hours to give product J i.e.

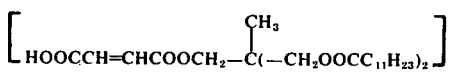

Dibutyltin oxide (12.5 g., 0.05M) was also added into the above solution containing product J and the desired product was obtained.

| Analysis | Calculated | Found |
|---|---|---|
| | Sn= 8.5% | Sn= 8.15% |
| | C =63.6% | C =64.87% |
| | H = 9.4% | H =10.0% |

Its structure was also confirmed by I.R. analysis

EXAMPLE 2

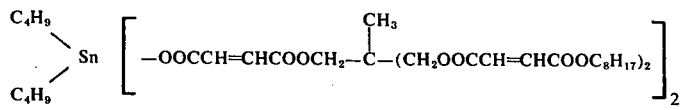

It was prepared by the same method as in Example 1 using the following quantities:

| Step 1 | (a) 1,1,1-Trimethylolethane | 12g(0.1M) |
|---|---|---|
| | (b) Lauric acid | 40g(0.2M) |
| Step 2 | (c) Maleic anhydride | 9.8g(0.1M) |
| Step 3 | (d) Dioctyltin oxide | 18g(0.05M) |

| Analysis | Calculated | Found |
|---|---|---|
| | C =65.3% | C =65.94% |
| | H = 9.8% | H =10.4% |
| | Sn= 7.8% | Sn= 7.45% |

Its structure was also confirmed by I.R.

EXAMPLE 3

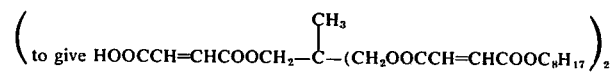

1,1,1 - Trimethylolethane (12g, 0.1M) and Maleic anhydride (28.4g, 0.3M) were heated in toluene under reflux for 2 hours [(to give $CH_3-C-(CH_2OOCCH=CHCOOH)_3$)] Iso-octyl alcohol (26g,0.2M) was also added into the solution, and the mixture further refluxed till the calculated amount of water had collected in Dean & Stark apparatus $\left(\text{to give HOOCCH=CHCOOCH}_2-\overset{CH_3}{\underset{|}{C}}-(CH_2OOCCH=CHCOOC_8H_{17})\right)_2$ After cooling the solution at room temperature dibutyltin oxide (12.5g,0.05M) was added into it and the mixture refluxed till the completion of reaction as in Exp. 1. The product is a light yellow liquid.

| Analysis | Calculated | Found |
|---|---|---|
| | Sn= 7.9% | Sn= 9.2% |
| | C =58.9% | C =58.3% |
| | H = 7.7% | H = 7.8% |

Its structure was also confirmed by I.R. analysis.

EXAMPLE 4

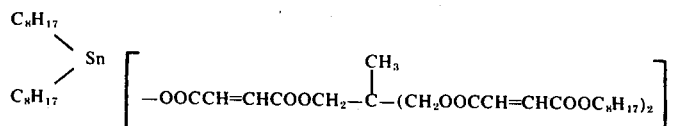

It was prepared by the same method and using the same quantities as in Experiment 3 (except using dioctyltin oxide (0.05M) instead of dibutyltin oxide)

EXAMPLE 5

The stabilizers of the present invention can be used with halogen containing vinyl and vinylidene resins in which the halogen is attached directly to the carbon atoms of the polymer chain. Preferably, the resin in vinyl halide resin, especially a vinyl chloride, resin.

The product of Example 1 of the present invention was tested for initial colour development against known stabilisers on an equal tin basis.

This example illustrates the stabilising effect of the compounds of the present invention in comparison with known stabilisers (ie Mellite 26 and Mellite 29) containing equal amount of tin in a rigid P.V.C. composition.

A series of rigid (non-plasticized) formulations was prepared having the following composition.
 a. Corvic D55/09 . . . 100 parts
 b. Laurex CS — Marked T if added the amount present in parts per 100 parts of polymer are indicated inside the brackets. In many instances of the present invention Laurex CS has not been added to the polymer because many of the compounds tested are themselves acting as a lubricant during milling at about 155°C,
 c. The example in Table 1 has been tested in comparison with Mellite 29 and Mellite 26 containing equal amount of tin in definite amount of Corvic D55/09 (usually 300 gms.)

| Additive ( ) is wt. % | Parts of Compound | Gardner scale colour after heating at 190°C for given time in minutes | | | |
|---|---|---|---|---|---|
| | | 0 | 5 | 10 | 15 |
| (a) Example 1 | (a) 2 parts | 0 | 2–3 | 5 | >9 |
| (b) M29 + T (0.5) | (b) Tin.Equiv. to (a) | 0 | 2–3 | 4 | 6–7 |
| (c) M26 + T (0.5) | (c) Tin Equiv to (a) | 0 | 2 | 3–4 | 6–7 |

We claim:

1. A stabilized polymer composition which comprises at least one resin containing at least 40% by weight of chlorine and selected from the group consisting of homopolymers of vinyl chloride and vinylidene chloride, post-chlorinated polyolefins and copolymers of vinyl chloride or vinylidene chloride with up to 25%, based on the weight of total monomers, of one or more copolymerizable monomers, and, as stabilizer therefor, 0.01 - 10% by weight (based on the weight of the resin) of an organotin compound of the formula $$R_1R_2Sn(Y)OCCH=CHC-OCH_2Q_1$$
(with two C=O groups)

wherein each $R_1$ and $R_2$, which are the same or different is an alkyl group of 1 to 20 carbon atoms, a cycloalkyl or a phenyl group, $Q_1$ is of formula

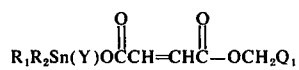

wherein $Q_2$ is hydrogen, an alkyl group of 1 to 6 carbon atoms, or $CH_2Z_3$, wherein $Z_3$ is as defined for $Z_1$ or $Z_2$ below, and each of $Z_1$ and $Z_2$, which are the same or different, is of formula

or a pair of radicals selected from the group consisting of $Z_1$, $Z_2$ and $Z_3$ forms a group of formula

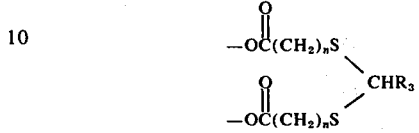

wherein $R_3$ is an alkyl group of 1 to 20 carbon atoms, a substituted or unsubstituted phenyl group or an alkyl phenyl group, which is substituted or unsubstituted, or two $R_3$ groups form a single bond between two carbon atoms, an alkylene group of 1 to 20 carbon atoms, an alkenylene group of 2 to 20 carbon atoms or a substituted or unsubstituted phenyl group; $R_4$ is an alkyl group of 1 to 20 carbon atoms, a substituted or unsubstituted phenyl alkyl group with 1 to 6 carbon atoms in the alkyl group, or two $R_4$ groups are bonded together to form an alkylene group of 1 to 20 carbon atoms which is unsubstituted or substituted by at least one phenyl group, or an alkenylene group of 2 to 20 carbon atoms or a cycloalkylene group of 5 or 6 carbon atoms, $R_5$ is an alkyl group of 1 to 20 carbon atoms, a substituted or unsubstituted phenyl group or an alkylphenyl group which is substituted or unsubstituted, or two $R_5$ groups are bonded together to form an alkylene group of 1 to 20 carbon atoms, $R_6$ is a single bond, an alkylene group of 1 to 20 carbon atoms or an alkenylene group of 2 to 20 carbon atoms, or a substituted or unsubstituted phenylene group, n is an integer of 1 to 6 and Y is of formula

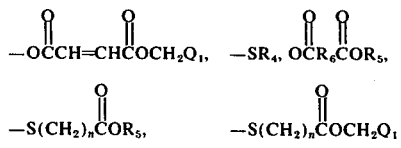

or Y and the group -OCOCH=CH=COOCH$_2$Q$_1$ together form a group of formula

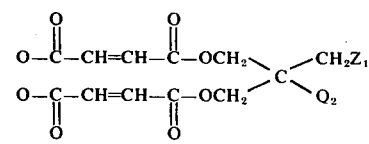

2. A stabilized polymer composition according to claim 1 wherein $Q_1$ is of the formula

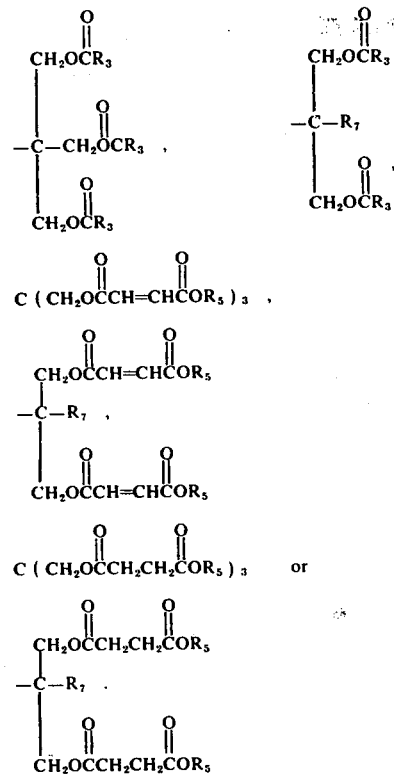

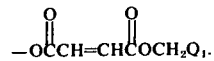

wherein $R_7$ is hydrogen or an alkyl group of 1 to 6 carbon atoms.

3. A composition according to claim 1 wherein Y is of formula $$-O\overset{O}{\underset{\|}{C}}CH=CH\overset{O}{\underset{\|}{C}}OCH_2Q_1.$$

4. A composition according to claim 1 which comprises 1–50%, based on the weight of the organotin compound, of monobutyltin tris(isooctyl thioglycollate).

5. A composition according to claim 1 which comprises 1–50%, based on the weight of the organotin compound, of at least one of di - (n-butyl)tin cyclic mercapto acetate, di - (n-octyl)tin cyclic mercapto acetate, di - (n-butyl)tin cyclic β - mercapto propionate and di - (n-octyl)tin cyclic β - mercapto propionate.

6. A composition according to claim 1 which comprises 0.01 –3%, based on the weight of the resin, of at least one hindered phenol.

* * * * *